(12) United States Patent
Izuhara et al.

(10) Patent No.: US 10,597,031 B2
(45) Date of Patent: Mar. 24, 2020

(54) DRIVE ASSIST APPARATUS (71) Applicant: DENSO CORPORATION, Kariya, Aichi-pref. (JP)

(72) Inventors: Hideshi Izuhara, Kariya (JP); Yasuhiko Mukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 171 days.

(21) Appl. No.: 15/578,653

(22) PCT Filed: Jun. 1, 2016

(86) PCT No.: PCT/JP2016/066218
§ 371 (c)(1),
(2) Date: Nov. 30, 2017

(87) PCT Pub. No.: WO2016/194960
PCT Pub. Date: Dec. 8, 2016

(65) Prior Publication Data
US 2018/0154893 A1 Jun. 7, 2018

(30) Foreign Application Priority Data
Jun. 2, 2015 (JP) .................. 2015-112209

(51) Int. Cl.
*B60W 30/10* (2006.01)
*G06K 9/00* (2006.01)
(Continued)

(52) U.S. Cl.
CPC ............ *B60W 30/10* (2013.01); *B60T 7/12* (2013.01); *B62D 15/025* (2013.01); *G05D 1/0246* (2013.01); *G06K 9/00798* (2013.01); *G08G 1/0962* (2013.01); *G08G 1/09626* (2013.01); *G08G 1/16* (2013.01); *G08G 1/162* (2013.01); *G08G 1/166* (2013.01); *G08G 1/167* (2013.01);
(Continued)

(58) Field of Classification Search
CPC .... B60W 30/10; B60T 7/12; B60T 2201/022; B60T 2201/081; B60T 2201/083; B60T 2201/087; B62D 15/025; G05D 1/0246; G06K 9/00798; G08G 1/09; G08G 1/0962; G08G 1/09626; G08G 1/16; G08G 1/162; G08G 1/166; G08G 1/167; G08G 1/096838; G01C 21/00; G09B 29/00; G09B 29/10; G07B 15/00
USPC ......................................................... 701/28
See application file for complete search history.

(56) References Cited

U.S. PATENT DOCUMENTS

2002/0135467 A1 9/2002 Koike
2006/0030987 A1 2/2006 Akita

FOREIGN PATENT DOCUMENTS

| JP | 2005-182186 A | 7/2005 |
| JP | 2007-213488 A | 8/2007 |
| JP | 2009-031205 A | 2/2009 |

*Primary Examiner* — Anthony R Jimenez
(74) *Attorney, Agent, or Firm* — Knobbe, Martens, Olson & Bear, LLP (57) ABSTRACT

A drive assist apparatus includes a position acquisition unit that acquires a position of an own vehicle, a position of a tollgate present ahead of the position of the own vehicle, and a position of a target lane in a road present ahead of the tollgate, a scheduled traveling route creation unit that creates a scheduled traveling route from the position of the own vehicle to the position of the target lane through the position of the tollgate, and a travel control unit that controls the own vehicle so as to travel along the scheduled traveling route.

5 Claims, 4 Drawing Sheets

(51) Int. Cl.
  *G08G 1/16* (2006.01)
  *G08G 1/0962* (2006.01)
  *B60T 7/12* (2006.01)
  *B62D 15/02* (2006.01)
  *G05D 1/02* (2006.01)
(52) U.S. Cl.
  CPC ... *B60T 2201/022* (2013.01); *B60T 2201/081* (2013.01); *B60T 2201/083* (2013.01); *B60T 2201/087* (2013.01)

DRIVE ASSIST APPARATUS

TECHNICAL FIELD

The present invention relates to a drive assist apparatus.

BACKGROUND ART

Conventionally, a drive assist apparatus described below is known. The drive assist apparatus captures an image of an area ahead of an own vehicle by using an in-vehicle camera, and creates image data. The drive assist apparatus recognizes a white line (traveling partition line) in the image data, and sets a travelling track of the own vehicle based on the recognized white line. Then, the drive assist apparatus controls a steering angle so that the own vehicle runs on the set traveling track (refer to Patent Literature 1).

CITATION LIST

Patent Literature

[Patent Literature 1] JP-A-2005-182186

SUMMARY OF THE INVENTION

Technical Problem

For example, no white lines may be provided, for example, in front of and behind a tollgate of an expressway. In this case, the drive assist apparatus disclosed in Patent Literature 1 cannot perform the above control.

Solution to Problem

An embodiment provides a drive assist apparatus that can perform drive assist even in a place where no white lines are present.

A drive assist apparatus of an embodiment includes: a position acquisition unit that acquires a position of an own vehicle, a position of a tollgate present ahead of the position of the own vehicle, and a position of a target lane in a road present ahead of the tollgate; a scheduled traveling route creation unit that creates a scheduled traveling route from the position of the own vehicle to the position of the target lane through the position of the tollgate; and a travel control unit that controls the own vehicle so as to travel along the scheduled traveling route.

DESCRIPTION OF THE EMBODIMENTS

Embodiments of the present invention will be described with reference to the drawings.

First Embodiment

1. Configuration of Drive Assist Apparatus 1

Figure 1:
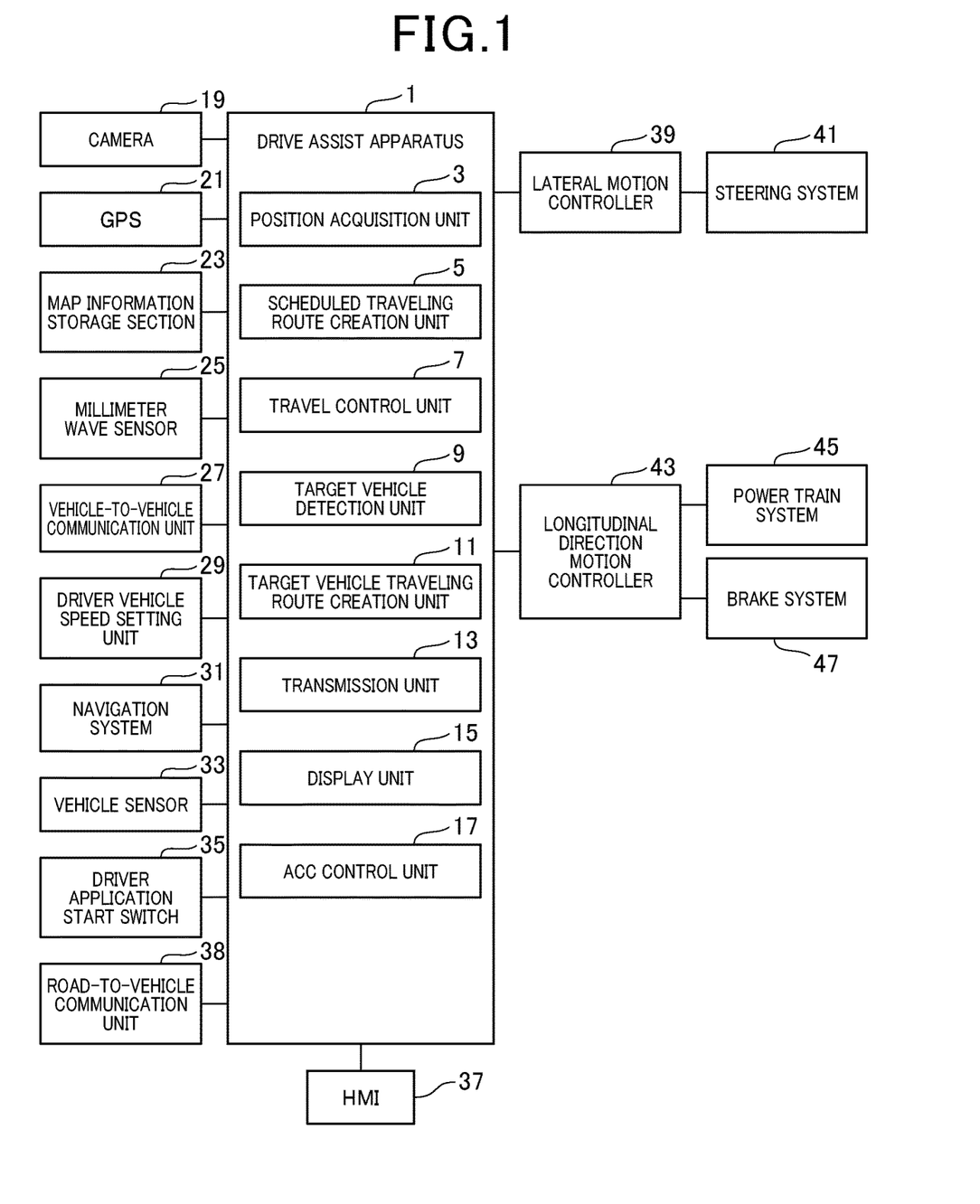
FIG. 1 is a block diagram showing a configuration of a drive assist apparatus.

The configuration of the drive assist apparatus 1 will be described with reference to FIG. 1. The drive assist apparatus 1 is an in-vehicle apparatus installed in a vehicle. Hereinafter, the vehicle in which the drive assist apparatus 1 is installed is referred to as an own vehicle. The drive assist apparatus 1 is a known computer including a CPU, a RAM, a ROM, and the like. The drive assist apparatus 1 performs the process described later by a program stored in the ROM.

The drive assist apparatus 1 includes, as functions, a position acquisition unit 3, a scheduled traveling route creation unit 5, a travel control unit 7, a target vehicle detection unit 9, a target vehicle traveling route creation unit 11, a transmission unit 13, a display unit 15, and an ACC (active cruise control) control unit 17. Functions of the units are described later.

The own vehicle includes, in addition to the drive assist apparatus 1, a camera 19, a GPS 21, a map information storage section 23, a millimeter wave sensor 25, a vehicle-to-vehicle communication unit 27, a driver vehicle speed setting unit 29, a navigation system 31, a vehicle speed sensor 33, a driver application start switch 35, an HMI (human-machine interface) 37, a road-to-vehicle communication unit 38, a lateral motion controller 39, a steering system 41, a longitudinal direction motion controller 43, a power train system 45, and a brake system 47.

Figure 4:
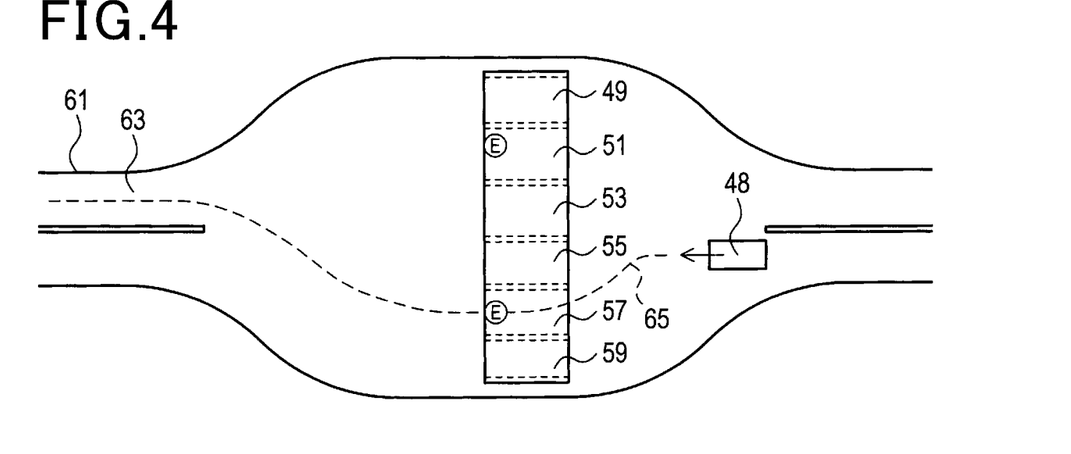
FIG. 4 is a drawing illustrating an example of a scheduled traveling route.

The camera 19 captures an image of an area around the own vehicle to crate image data. The GPS 21 acquires a position of the own vehicle. The map information storage section 23 is configured by a storage unit and stores map information. The map information includes information on positions of roads, the number of lanes of the roads, positions of the lanes, tollgates (positions of the tollgates, whether or not each of the tollgates supports ETC), and the like. It is noted that, in the present embodiment, a tollgate denotes a portion having one path through which one vehicle can pass. For example, tollgates 49, 51, 53, 55, 57, and 59 shown in FIG. 4 are individual tollgates. Among them, the tollgates 51 and 57 support ETC, and the other tollgates do not support ETC.

The millimeter wave sensor 25 uses millimeter waves to detect a position of a target (e.g. target vehicle (another vehicle) or the like) present around the own vehicle. The vehicle-to-vehicle communication unit 27 performs vehicle-to-vehicle communication with the target vehicle. The driver vehicle speed setting unit 29 accepts input operation by the driver of the own vehicle. The information input to the driver vehicle speed setting unit 29 includes vehicle speed under ACC control.

The navigation system 31 is a known navigation system. The driver application start switch 35 is a switch accepting operation by the driver of the own vehicle. The operation by the driver includes instructing start and stop of the ACC control. The HMI 37 includes a display, loudspeakers, a microphone, an input unit, and the like provided in the vehicle interior of the own vehicle. The road-to-vehicle communication unit 38 communicates with facilities on roads.

The lateral motion controller 39 controls the steering system 41. The steering system 41 performs steering of the own vehicle. The longitudinal direction motion controller 43 controls the power train system 45 and the brake system 47. The power train system 45 includes an engine and a mechanism transmitting power of the engine to drive wheels. The brake system 47 performs braking operation of the own vehicle.

2. Scheduled Traveling Route Creation Process Performed by Drive Assist Apparatus 1

A scheduled traveling route creation process performed by the drive assist apparatus 1 will be described with reference to FIG. 2 to FIG. 6. This process is performed when the driver has performed operation for instructing start of ACC control to the driver application start switch 35.

Figure 2:
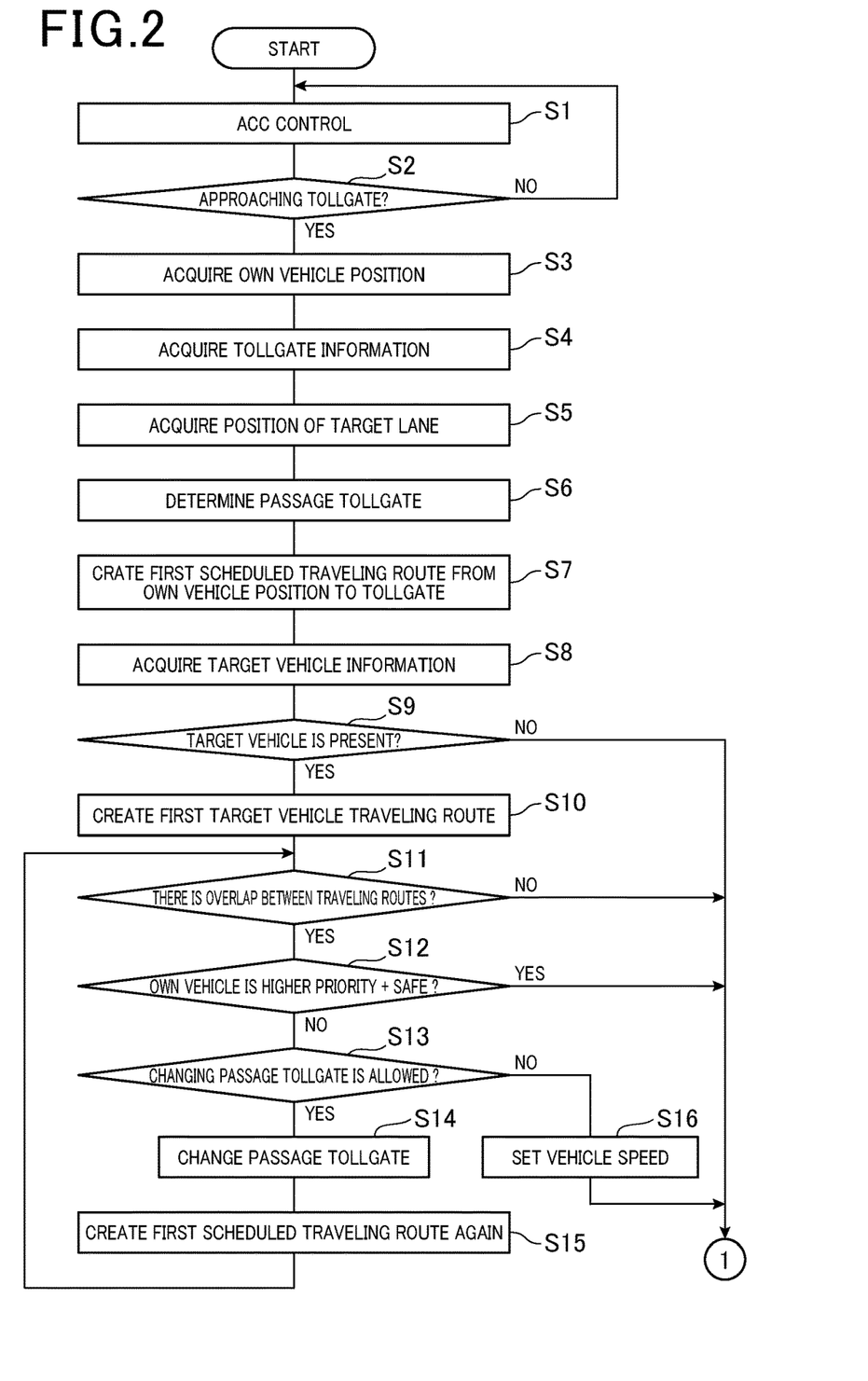
FIG. 2 is a flowchart of a scheduled traveling route creation process performed by the drive assist apparatus.

In step 1 in FIG. 2, the ACC control unit 17 performs typical ACC control. An overview of the ACC control is as below. The ACC control unit 17 acquires an image of an area ahead of the own vehicle by using the camera 19, and obtains image data. The ACC control unit 17 recognizes a white line by using a known image-recognition technique for the image data, and sets a travelling track of the own vehicle based on the recognized white line. Then, the ACC control unit 17 appropriately controls a steering angle by using the lateral motion controller 39 and the steering system 41 so that the own vehicle does not deviate from the travelling track.

In addition, the ACC control unit 17 recognizes a leading vehicle by using the image data of the camera 19 and the millimeter wave sensor 25, and calculates a distance from the own vehicle to the leading vehicle. Then, the ACC control unit 17 adjusts a vehicle speed of the own vehicle by using the longitudinal direction motion controller 43, the power train system 45, and the brake system 47 so that the distance is kept in a preset target value.

In step 2, the position acquisition unit 3 determines whether or not the own vehicle is approaching a tollgate of an expressway or the like. Specifically, the following determination is made. The position acquisition unit 3 acquires a position of the own vehicle (hereinafter, referred to as an own vehicle position) by using the GPS 21. Next, the position acquisition unit 3 uses map information read from the map information storage section 23 to search for a tollgate present ahead of the own vehicle position. If a tollgate is present ahead of the own vehicle position, and the distance from the own vehicle position to the position of the tollgate is a predetermined threshold value or less, the position acquisition unit 3 determines that the own vehicle is approaching the tollgate. If the own vehicle is approaching the tollgate, the process proceeds to step 3, and otherwise, the process proceeds to step 1.

In step S3, the position acquisition unit 3 acquires an own vehicle position by using the GPS 21.

In step S4, the position acquisition unit 3 reads tollgate information on the tollgate that the own vehicle is approaching, the approach being determined in the step 2. When a plurality of tollgates are present which the own vehicle is approaching, the approach being determined in the step 2, the position acquisition unit 3 reads tollgate information of each of the tollgates.

In step 5, the position acquisition unit 3 acquires the position of a target lane by using the map information. As shown in FIG. 4, a target lane 63 is one lane of a road 61 present ahead of tollgates 49, 51, 53, 55, 57, and 59 present ahead of an own vehicle 48. The target lane 63 is a scheduled lane through which the own vehicle 48 will run. The road 61 is, for example, an expressway.

It is noted that the position acquisition unit 3 determines a target lane as below. When a route after the time when the vehicle enters the road 61 is set in the navigation system 31, the position acquisition unit 3 acquires the target lane 63 corresponding to the route. For example, when a route branching off left in the road 61 is set in the navigation system 31, the left side lane is set to a target lane, and when a route branching off right in the road 61 is set in the navigation system 31, the right side lane is set as a target lane In addition, when a route after the time when the vehicle enters the road 61 is not set in the navigation system 31, or a straight route is set, a target lane is determined according to a preset indication (e.g. an indication that the leftmost lane is selected).

In step 6, the scheduled traveling route creation unit 5 determines one tollgate through which the own vehicle passes (hereinafter, referred to as a passage tollgate) among the tollgates present ahead of the own vehicle. For example, in the example shown in FIG. 4, one tollgate 57 is defined as a passage tollgate among the tollgates 49, 51, 53, 55, 57, and 59 present ahead of the own vehicle 48.

The criterion for determining the passage tollgate may be appropriately set. For example, the tollgate closest when the own vehicle is assumed to run in a straight line without change may be defined as the passage tollgate. In addition, the tollgate closest to the straight line connecting between the own vehicle position and the position of the target lane may be defined as the passage tollgate. In addition, the tollgate closest among the tollgates supporting ETC when the own vehicle is assumed to run in a straight line without change may be defined as a passage tollgate. In addition, the tollgate closest to a straight line connecting the own vehicle position and the position of the target lane among the tollgates supporting ETC may be defined as the passage tollgate.

In addition, a passage tollgate may be determined from tollgates excluding closed tollgates based on any of the above criterions. The closed tollgate can be specified by the communication using the road-to-vehicle communication unit 38.

It is noted that information on the position of a tollgate and whether the tollgate supports ETC is included in the tollgate information read in the step 4.

In step 7, the scheduled traveling route creation unit 5 creates a scheduled traveling route to the passage tollgate determined in the step S6 (hereinafter, referred to as a first scheduled traveling route). The first scheduled traveling route may be, for example, a traveling route connecting the own vehicle position and the passage tollgate by a straight line.

In step 8, the target vehicle detection unit 9 performs a process for acquiring target vehicle information by using the vehicle-to-vehicle communication unit 27. The target vehicle information includes a position, speed, a state of direction indicators and the like of a target vehicle. The target vehicle transmits the target vehicle information all the time. It is noted that a target vehicle may be detected by using the camera 19 or the millimeter wave sensor 25. Thereafter, the detection results (a position, speed, a traveling direction of the target vehicle) may be used as the target vehicle information.

In step 9, based on the result of the process of the step 8, the target vehicle detection unit 9 determines whether or not a target vehicle is present around the own vehicle and short of the tollgate. That is, when (a) target vehicle information can be acquired by using the vehicle-to-vehicle communication unit 27, and the position of the target vehicle included in the target vehicle information is short of the tollgate, or when (b) a target vehicle present short of the tollgate is detected by using the camera 19 or the millimeter wave sensor 25, the target vehicle detection unit 9 determines that a target vehicle is present short of the tollgate, and the process proceeds to step 10.

In contrast, when (c) target vehicle information cannot be acquired, and a target vehicle present short of the tollgate cannot be detected by the camera 19 or the millimeter wave sensor 25, or when (d) the position of the target vehicle included in the target vehicle information is ahead of the tollgate, and the camera 19 or the millimeter wave sensor 25 cannot detect a target vehicle present short of the tollgate, the target vehicle detection unit 9 determines that a target vehicle is not present short of the tollgate, and the process proceeds to step 17.

In step 10, the target vehicle traveling route creation unit 11 creates a scheduled traveling route of the target vehicle (hereinafter, referred to as a first target vehicle traveling route), which is determined to be present in the step 9, from the current position of the target vehicle to the tollgate.

Basically, the first target vehicle traveling route is a route to the tollgate closest to the path through the own vehicle is assumed to run in a straight line without change. It is noted that when the target vehicle information includes information on the direction indicators indicating leftward or rightward route change, the traveling route to the tollgate closest to the route after the route change is defined as the first target vehicle traveling route.

Figure 5:
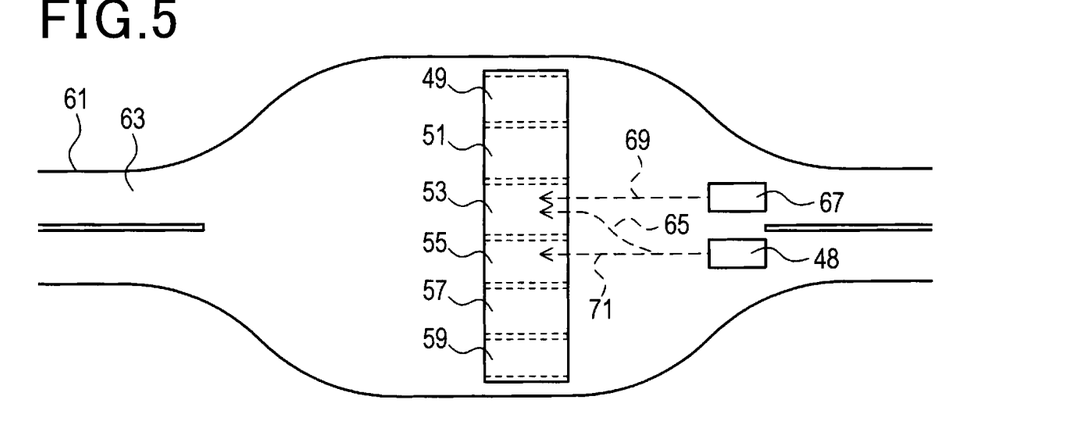
FIG. 5 is a drawing illustrating an example of a first scheduled traveling route.

In step 11, the scheduled traveling route creation unit 5 determines whether or not there is an overlap between the first scheduled traveling route created in the step 7 and the first target vehicle traveling route created in the step 7. For example, as shown in FIG. 5, when a first scheduled traveling route 65 of the own vehicle 48 and a first target vehicle traveling route 69 of the target vehicle 67 lead to the same tollgate 53, there is an overlap between the first scheduled traveling route 65 and the first target vehicle traveling route 69.

If there is an overlap between the first scheduled traveling route and the first target vehicle traveling route, the process proceeds to step 12. If there is no overlap between the first scheduled traveling route and the first target vehicle traveling route, the process proceeds to step 17.

In step 12, the scheduled traveling route creation unit 5 determines which has a higher priority, the own vehicle or the target vehicle. As shown in FIG. 5, when the first scheduled traveling route 65 of the own vehicle 48 is a traveling route that changes leftward or rightward, and the first target vehicle traveling route 69 of the target vehicle 67 is a traveling route that is straight, the target vehicle has a higher priority. In contrast, when the first scheduled traveling route of the own vehicle is a traveling route that is straight, and the first target vehicle traveling route is a traveling route that changes leftward or rightward, the own vehicle has a higher priority.

In addition, in the step 12, vehicle speed of the own vehicle is adjusted to determine whether or not contact between the own vehicle and the target vehicle can be avoided without changing the first scheduled traveling route. The cases where contact between the own vehicle and the target vehicle can be avoided without changing the first scheduled traveling route include, for example, a case where only one target vehicle is detected. In addition, the cases where contact between the own vehicle and the target vehicle cannot be avoided without changing the first scheduled traveling route include, for example, a case where a plurality of target vehicles run in a line in the longitudinal direction.

As a result of the above determination, the own vehicle has a priority, and the vehicle speed of the own vehicle is adjusted. Hence, if contact between the own vehicle and the target vehicle can be avoided without changing the first scheduled traveling route, the process proceeds to step 17, and otherwise, the process proceeds to step 13.

In step 13, the scheduled traveling route creation unit 5 determines whether or not changing the passage tollgate is allowed (i.e. whether or not another tollgate is present which can be an alternative of the passage tollgate determined in the step 6). It is noted that another tollgate that can be an alternative denotes a tollgate that has not been yet selected as a passage tollgate among the tollgates present on the periphery.

When the passage tollgate can be changed, the process proceeds to step 14. If the passage tollgate cannot be changed, the process proceeds to step 16.

In step 14, the scheduled traveling route creation unit 5 makes a change of the passage tollgate to another tollgate. The passage tollgate after the change may be, for example, a tollgate closest to the passage tollgate before the change among other tollgates that can be an alternative. In addition, the passage tollgate after the change may be, for example, a tollgate farther from the target vehicle than the passage tollgate before the change among other tollgates that can be an alternative.

In step 15, the scheduled traveling route creation unit 5 creates a first scheduled traveling route from the own vehicle position to the position of the passage tollgate after the change in the step 14. The first scheduled traveling route may be, for example, a traveling route connecting between the own vehicle position and the position of the passage tollgate by a straight line.

For example, as shown in FIG. 5, when the passage tollgate is changed from the tollgate 53 to the tollgate 55, a new first scheduled traveling route 71 is created instead of the previous first scheduled traveling route 65.

In step 16, the vehicle speed of the own vehicle when the own vehicle runs on the first scheduled traveling route is set. The set vehicle speed can avoid contact between the own vehicle running on the first scheduled traveling route and the target vehicle running on the first target vehicle traveling route.

The vehicle speed can be set as below. First, the timing when the target vehicle passes through the overlap between the first scheduled traveling route and the first target vehicle traveling route is calculated by using the target vehicle information. Next, the vehicle speed of the own vehicle is set so that the timing when the own vehicle passes through the above overlap deviates from the timing of the target vehicle.

Figure 3:
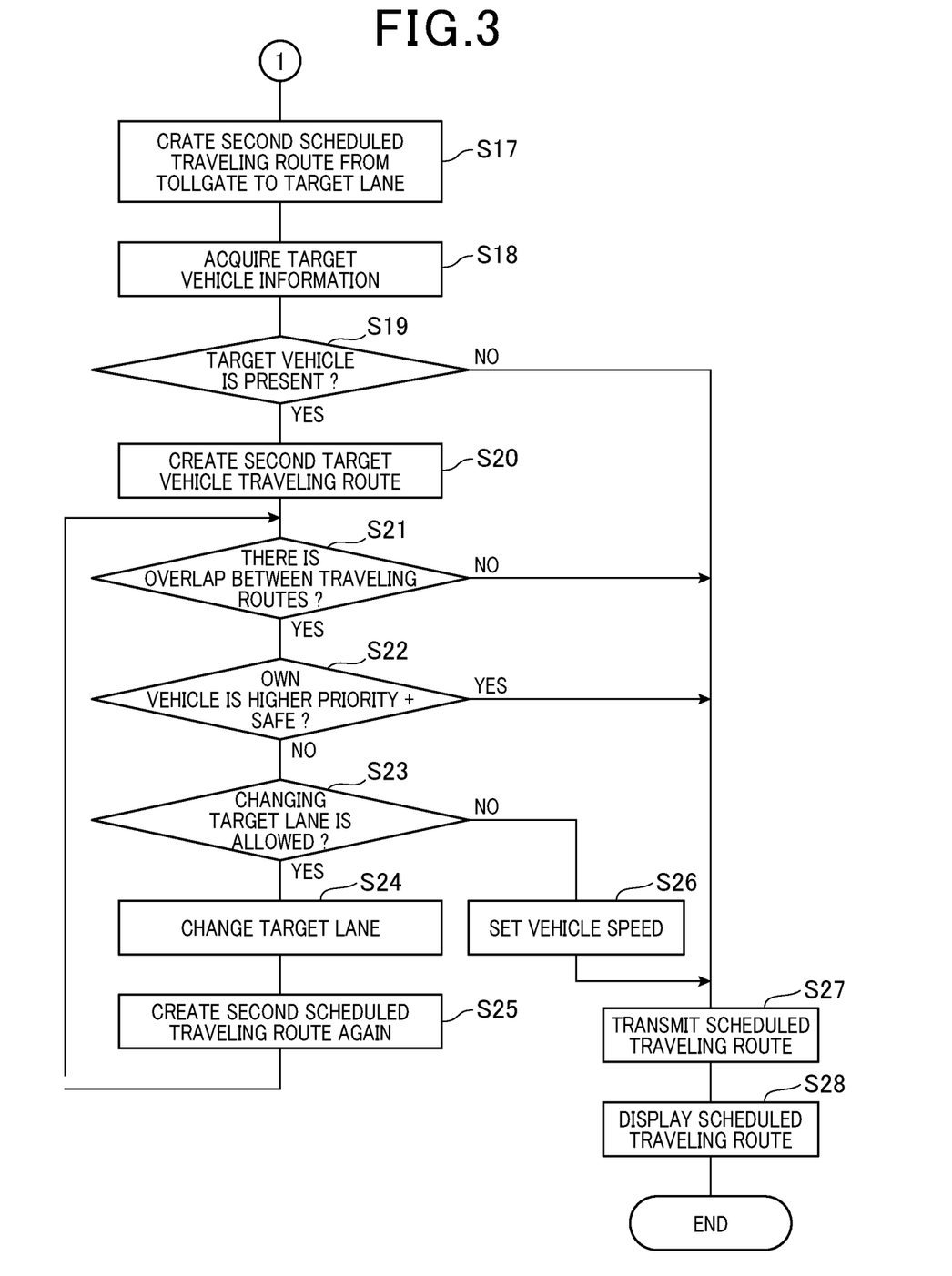
FIG. 3 is the flowchart of the scheduled traveling route creation process performed by the drive assist apparatus.

In step 17 in FIG. 3, the scheduled traveling route creation unit 5 creates a scheduled traveling route (hereinafter, referred to as a second scheduled traveling route) from the position of the passage tollgate determined in the step 6 or the step 14 to the position of the target lane acquired in the step 5.

Figure 6:
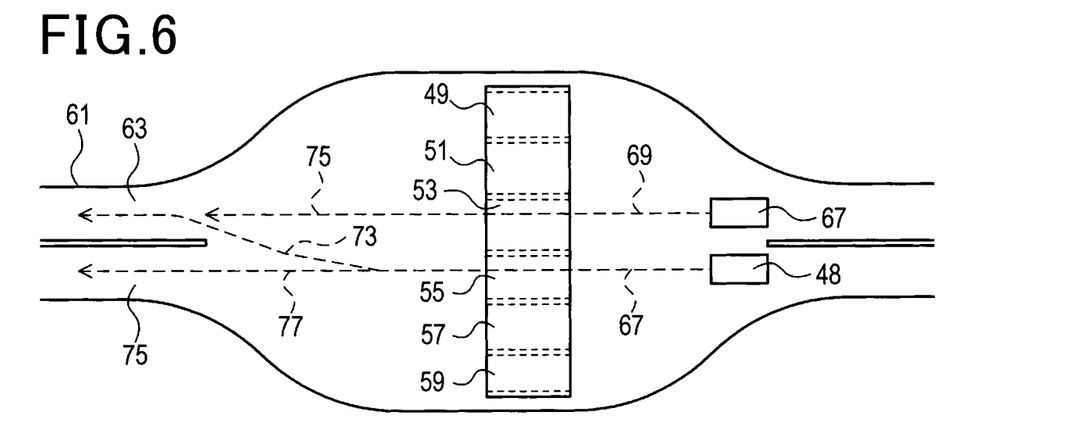
FIG. 6 is a drawing illustrating an example of the first scheduled traveling route and a second scheduled traveling route.

For example, as shown in FIG. 6, a second scheduled traveling route 73 from the tollgate 55, which is a passage tollgate, to the position of the target lane 63 is created. The second scheduled traveling route may be, for example, a traveling route connecting the position of the passage tollgate and the target lane by a straight line. Hereinafter, the combination of the first scheduled traveling route and the second scheduled traveling route is referred to as a scheduled traveling route.

In step 18, the target vehicle detection unit 9 performs the process of acquiring target vehicle information by using the vehicle-to-vehicle communication unit 27. The contents of the target vehicle information are similar to those acquired in the step 8.

In step 19, the target vehicle detection unit 9 determines whether or not a target vehicle is present around the own vehicle based on the process of the step 18. That is, if target vehicle information is acquired by using the vehicle-to-vehicle communication unit 27, or if a target vehicle is detected by using the camera 19 or the millimeter wave sensor 25, the target vehicle detection unit 9 determines that a target vehicle is present, and the process proceeds to step 21. In contrast, if target vehicle information cannot be acquired by using the vehicle-to-vehicle communication unit 27, and a target vehicle cannot be detected by using the camera 19 or the millimeter wave sensor 25, the target vehicle detection unit 9 determines that a target vehicle is not present, and the process proceeds to step 27.

In step 20, the target vehicle traveling route creation unit 11 creates a scheduled traveling route ahead of the tollgate (hereinafter, referred to as a second target vehicle traveling route) of the target vehicle that is determined to be present in the step 19.

Basically, the second target vehicle traveling route is a traveling route from the end of the first target vehicle traveling route (the tollgate through which the target vehicle passes) to the lane closest to the path through the target vehicle is assumed to run in a straight line without change. It is noted that when the target vehicle information includes information on the direction indicators indicating leftward or rightward route change, the traveling route to the lane closest to the route after the route change is defined as the second target vehicle traveling route.

In step 21, the scheduled traveling route creation unit 5 determines whether or not there is an overlap between the second scheduled traveling route created in the step 17 and the second target vehicle traveling route created in the step 20. For example, as shown in FIG. 6, when the second scheduled traveling route 73 of the own vehicle 48 and a second target vehicle traveling route 75 of the target vehicle 67 lead to the same lane, there is an overlap between the second scheduled traveling route 73 and the second target vehicle traveling route 75.

If there is an overlap between the second scheduled traveling route and the second target vehicle traveling route, the process proceeds to step 22. If there is no overlap between the second scheduled traveling route and the second target vehicle traveling route, the process proceeds to step 27.

In step 22, the scheduled traveling route creation unit 5 determines which has a higher priority, the own vehicle or the target vehicle. As shown in FIG. 6, when the second scheduled traveling route 73 of the own vehicle 48 is a traveling route that changes leftward or rightward, and the second target vehicle traveling route 75 of the target vehicle 67 is a traveling route that is straight, the target vehicle has a higher priority. In contrast, when the second scheduled traveling route of the own vehicle is a traveling route that is straight, and the second target vehicle traveling route is a traveling route that changes leftward or rightward, the own vehicle has a higher priority.

In addition, in the step 22, the scheduled traveling route creation unit 5 determine whether or not contact between the own vehicle and the target vehicle can be avoided by adjusting vehicle speed of the own vehicle without changing the second scheduled traveling route. The cases where contact between the own vehicle and the target vehicle can be avoided without changing the second scheduled traveling route include, for example, a case where only one target vehicle is detected. In addition, the cases where contact between the own vehicle and the target vehicle cannot be avoided without changing the second scheduled traveling route include, for example, a case where a plurality of target vehicles run in a line in the longitudinal direction.

As a result of the above determination, the own vehicle has a priority, and the vehicle speed of the own vehicle is adjusted. Hence, if contact between the own vehicle and the target vehicle can be avoided without changing the second scheduled traveling route, the process proceeds to step 27, and otherwise, the process proceeds to step 23.

In step 23, the scheduled traveling route creation unit 5 determines whether or not changing the target lane can be allowed (i.e. whether or not another lane, which can be an alternative of the target lane acquired in the step 5, is present on the same road). It is noted that "another lane that can be an alternative" denotes a lane to which a second scheduled traveling route leads, the second scheduled traveling route not having been created yet.

When the target lane can be changed, the process proceeds to step 24. If the target lane cannot be changed, the process proceeds to step 26.

In step 24, the scheduled traveling route creation unit 5 makes a change from the target lane to another lane. The target lane after the change may be, for example, a lane closest to the lane before the change among other lanes that can be an alternative. In addition, the target lane after the change may be, for example, a lane farther from the target vehicle than the target lane before the change among other lanes that can be an alternative.

In step 25, the scheduled traveling route creation unit 5 creates a second scheduled traveling route from the position of the passage tollgate to the position of the target lane after the change in the step 14. The second scheduled traveling route may be, for example, a traveling route connecting between the position of the passage tollgate and the position of the target lane by a straight line.

For example, as shown in FIG. 6, when the target lane is changed from the lane 63 to the lane 75, the scheduled traveling route creation unit 5 creates a new second scheduled traveling route 77 instead of the previous second scheduled traveling route 73.

In step 26, the scheduled traveling route creation unit 5 sets vehicle speed of the own vehicle when the own vehicle runs on the second scheduled traveling route. The set vehicle speed can avoid contact between the own vehicle running on the second scheduled traveling route and the target vehicle running on the second target vehicle traveling route.

The vehicle speed can be set as below. First, the timing when the target vehicle passes through the overlap between the second scheduled traveling route and the second target vehicle traveling route is calculated by using the target vehicle information. Next, the vehicle speed of the own vehicle is set so that the timing when the own vehicle passes through the above overlap deviates from the timing of the target vehicle. Thereafter, the process proceeds to step 27.

In step 27, the transmission unit 13 uses the vehicle-to-vehicle communication unit 27 to transmit information representing the scheduled traveling route to the outside of the own vehicle.

In step 28, the display unit 15 uses the display of the HMI 37 to display the scheduled traveling route for the occupant of the own vehicle.

3. Travel Control Process Performed by Drive Assist Apparatus 1

When a scheduled traveling route is created, the travel control unit 7 controls the own vehicle so as to run along the scheduled traveling route. It is noted that when the scheduled traveling route is created, the typical ACC control automatically ends.

That is, the travel control unit 7 acquires an own vehicle position by using the GPS 21, and appropriately performs steering by using the lateral motion controller 39 and the steering system 41 so that the own vehicle position does not deviate from the scheduled traveling route.

In addition, the travel control unit 7 repeatedly acquires a vehicle speed of the own vehicle by using the vehicle sensor 33, and controls the longitudinal direction motion controller 43, the power train system 45, and the brake system 47 so that the vehicle speed depends on a curvature of each part of the scheduled traveling route.

In addition, the travel control unit 7 controls the longitudinal direction motion controller 43, the power train system 45, and the brake system 47 so that the vehicle speed of the own vehicle becomes a vehicle speed previously set for each section of the scheduled traveling route. For example, when the vehicle passes through a tollgate, control is performed so that the vehicle speed becomes a proper speed (low speed). In addition, after the own vehicle passes through the tollgate, and when the own vehicle runs to a target lane, the own vehicle is accelerated.

In addition, when a vehicle speed is set in the steps 16, 26, the travel control unit 7 controls the longitudinal direction motion controller 43, the power train system 45, and the brake system 47 so that the vehicle speed of the own vehicle becomes the set vehicle speed.

4. Effects Provided by Drive Assist Apparatus 1

(1A) The drive assist apparatus 1 can creates a scheduled traveling route even when no white line is present in the vicinity of the tollgate to control the own vehicle so as to run along the scheduled traveling route.

(1B) The drive assist apparatus 1 can acquire the position of a tollgate and the position of a target lane by using map information. Thereby, the positions can be acquired easily and correctly.

(1C) The drive assist apparatus 1 can detect a target vehicle present around the own vehicle to create a target vehicle traveling route, which is a scheduled traveling route of the target vehicle. Then, the drive assist apparatus 1 can create a scheduled traveling route so that the target vehicle running on the target vehicle traveling route and the own vehicle do not contact each other. Hence, safety of the own vehicle becomes still higher.

(1D) The drive assist apparatus 1 can transmit information representing the created scheduled traveling route to the outside of the own vehicle. The target vehicle, which receives the information, can recognize the scheduled traveling route of the own vehicle. Hence, safety of the own vehicle and the target vehicle become still higher.

(1E) The drive assist apparatus 1 can display the created scheduled traveling route for the occupant of the own vehicle.

Other Embodiments

Hereinbefore, an embodiment of the present invention has been described. However, the present invention is not limited to the above embodiment, but may be variously modified.

(1) The drive assist apparatus 1 may create a scheduled traveling route from the own vehicle position to the position of a target lane through the position of a passage tollgate together.

(2) The drive assist apparatus 1 may acquire the position of a tollgate and the position of a target lane by using the camera 19 or the millimeter wave sensor 25. In addition, the drive assist apparatus 1 may acquire the position of a tollgate and the position of a target lane by using another sensor.

(3) If a positive determination is made in the step 11, the process may proceed to the step 13 in any case. In addition, if a positive determination is made in the step 21, the process may proceed to the step 23 in any case.

(4) Functions of one element in the above embodiment may be divided among a plurality of elements. Functions of a plurality of elements may be integrated into one element. In addition, at least part of the configuration of the above embodiment may be replaced with a known configuration having similar functions. In addition, part of the configuration of the above embodiment may be omitted. In addition, at least part of the configuration of the above embodiment may be added to or replaced with the configuration of another embodiment.

(5) In addition to the drive assist apparatus described above, the present invention may be implemented by various embodiments such as a system including the drive assist apparatus as an element, a program allowing a computer to function as the drive assist apparatus, a medium storing the program, and a drive assist method.

The drive assist apparatus of the embodiment includes: a position acquisition unit (3) that acquires a position of an own vehicle, a position of a tollgate present ahead of the position of the own vehicle, and a position of a target lane in a road present ahead of the tollgate; a scheduled traveling route creation unit (5) that creates a scheduled traveling route from the position of the own vehicle to the position of the target lane through the position of the tollgate; and a travel control unit (7) that controls the own vehicle so as to travel along the scheduled traveling route.

According to the drive assist apparatus of the above embodiment, for example, even in a place where no white lines are present, a scheduled traveling route can be created to control the own vehicle so as to run along the scheduled traveling route.

REFERENCE SIGNS LIST

1 . . . drive assist apparatus,
3 . . . position acquisition unit,
5 . . . scheduled traveling route creation unit,
7 . . . travel control unit,
9 . . . target vehicle detection unit,
11 . . . target vehicle traveling route creation unit,
13 . . . transmission unit,
15 . . . display unit,
17 . . . ACC control unit,
19 . . . camera,
21 . . . GPS,
23 . . . map information storage section,
25 . . . millimeter wave sensor,
27 . . . vehicle-to-vehicle communication unit, 29 . . . driver vehicle speed setting unit,
31 . . . navigation system,
33 . . . vehicle sensor,
35 . . . driver application start switch,
37 . . . HMI,
38 . . . road-to-vehicle communication unit,
39 . . . lateral motion controller,
41 . . . steering system,
43 . . . longitudinal direction motion controller,
45 . . . power train system,
47 . . . brake system,
48 . . . own vehicle,
49, 51, 53, 55, 57, 59 . . . tollgate,
61 . . . road,
63 . . . target lane,
65, 71 . . . first scheduled traveling route,
67 . . . target vehicle,
69 . . . first target vehicle traveling route,
73, 77 . . . second scheduled traveling route,
75 . . . second target vehicle traveling route

The invention claimed is:

1. A drive assist apparatus comprising:
a position acquisition unit that acquires a position of an own vehicle, a position of a tollgate present ahead of the position of the own vehicle, and a position of a target lane in a road present ahead of the tollgate;
a scheduled traveling route creation unit that creates a scheduled traveling route from the position of the own vehicle to the position of the target lane through the position of the tollgate;
a travel control unit that controls the own vehicle so as to travel along the scheduled traveling route;
an other vehicle detection unit that detects an other vehicle; and
an other vehicle traveling route creation unit that creates an other vehicle traveling route, which is a scheduled traveling route of the other vehicle detected by the other vehicle detection unit, wherein
the scheduled traveling route creation unit determines whether or not the other vehicle traveling on the other vehicle traveling route and the own vehicle traveling on the scheduled traveling route will contact each other, and determines which is a priority, the own vehicle or the other vehicle, and
based on the scheduled traveling route creation unit determining that the other vehicle and the own vehicle will contact each other and that the other vehicle is a priority, the scheduled traveling route creation unit creates the scheduled traveling route again so that the other vehicle and the own vehicle do not contact each other.

2. The drive assist apparatus according to claim 1, wherein the position acquisition unit acquires the position of the tollgate and the position of the target lane by using a sensor installed in the own vehicle or map information.

3. The drive assist apparatus according to claim 1, further comprising a transmission unit that transmits information representing the scheduled traveling route to outside of the own vehicle.

4. The drive assist apparatus according to claim 1, further comprising a display unit that displays the scheduled traveling route for an occupant of the own vehicle.

5. The drive assist apparatus according to claim 1, wherein the drive assist apparatus is installed on the own vehicle.

* * * * *